(12) United States Patent
Nakamura

(10) Patent No.: US 9,182,534 B2
(45) Date of Patent: Nov. 10, 2015

(54) DISPLAY DEVICE AND TELEVISION RECEIVER

(75) Inventor: Shinichi Nakamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/124,586

(22) PCT Filed: Apr. 2, 2012

(86) PCT No.: PCT/JP2012/058814
§ 371 (c)(1),
(2), (4) Date: Feb. 25, 2014

(87) PCT Pub. No.: WO2012/169268
PCT Pub. Date: Dec. 13, 2012

(65) Prior Publication Data
US 2014/0184929 A1     Jul. 3, 2014

(30) Foreign Application Priority Data

Jun. 7, 2011   (JP) ................. 2011-127540

(51) Int. Cl.
*F21V 8/00*     (2006.01)
*G02F 1/1333*   (2006.01)
*H04N 5/655*    (2006.01)
*H04N 5/64*     (2006.01)

(52) U.S. Cl.
CPC ............ *G02B 6/0081* (2013.01); *G02B 6/0031* (2013.01); *G02B 6/0091* (2013.01); *G02F 1/133308* (2013.01); *H04N 5/655* (2013.01); *G02B 6/0085* (2013.01); *G02F 2001/133322* (2013.01); *G02F 2201/50* (2013.01); *H04N 5/64* (2013.01)

(58) Field of Classification Search
CPC .. G02B 6/0031; G02B 6/0081; G02B 6/0085; G02B 6/0088; G02F 1/133308; G02F 2001/133322; G02F 2201/50; H04N 5/64; H04N 5/655
USPC .......................... 348/836; 362/633, 609, 612
See application file for complete search history.

(56) References Cited

U.S. PATENT DOCUMENTS

| | | |
|---|---|---|
| 5,640,216 A | 6/1997 | Hasegawa et al. |
| 5,805,249 A | 9/1998 | Hasegawa et al. |
| 5,815,224 A | 9/1998 | Hasegawa et al. |

(Continued)

FOREIGN PATENT DOCUMENTS

| | | |
|---|---|---|
| JP | 7-281184 A | 10/1995 |
| JP | 11-311952 A | 11/1999 |

(Continued)

*Primary Examiner* — Sath V Perungavoor
*Assistant Examiner* — Peter D Le
(74) *Attorney, Agent, or Firm* — Birch, Stewart, Kolasch & Birch, LLP

(57) ABSTRACT

Provided are: a thin display device that has reduced dimensions between a light guide plate and a display panel; and a television receiver provided with the display device. By threading screws, the edge of an opening and a bottom part press, with an elastic member interposed therebetween, the display panel and the light guide plate together. As a result, the dimensions between the display panel and the light guide plate can be reduced by sandwiching the display panel and the light guide plate by a front cabinet and a back cabinet from the front and back without interposing a support member between the display panel and the light guide plate.

12 Claims, 8 Drawing Sheets

(56) References Cited

U.S. PATENT DOCUMENTS

| | | | |
|---|---|---|---|
| 5,946,062 A | 8/1999 | Hasegawa et al. | |
| 2003/0043569 A1* | 3/2003 | Mori et al. | 362/31 |
| 2007/0287079 A1* | 12/2007 | Li et al. | 430/7 |
| 2008/0285290 A1* | 11/2008 | Ohashi et al. | 362/373 |
| 2009/0015748 A1 | 1/2009 | Kujiraoka et al. | |
| 2009/0201669 A1* | 8/2009 | Hamada | 362/97.3 |
| 2011/0109841 A1 | 5/2011 | Umekawa | |

FOREIGN PATENT DOCUMENTS

| | | |
|---|---|---|
| JP | 2006-330599 A | 12/2006 |
| JP | 2007-233927 A | 9/2007 |
| JP | 2008-311234 A | 12/2008 |
| JP | 2009-37212 A | 2/2009 |
| JP | 2010-78738 A | 4/2010 |
| JP | 2010-122429 A | 6/2010 |
| JP | 2011-13506 A | 1/2011 |
| WO | WO 2010/004792 A1 | 1/2010 |

* cited by examiner

F I G. 1
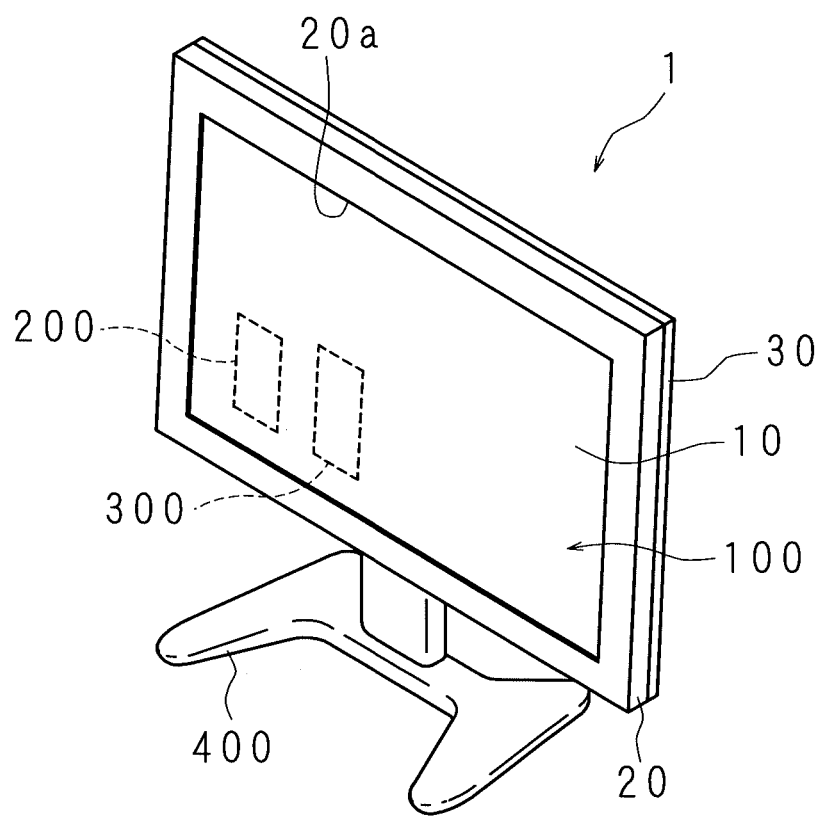

DISPLAY DEVICE AND TELEVISION RECEIVER

CROSS-REFERENCE TO RELATED APPLICATIONS

This application is the national phase under 35 U.S.C. §371 of PCT International Application No. PCT/JP2012/058814 which has International filing date of Apr. 2, 2012 and designated the United States of America.

FIELD

The present invention relates to a display device for displaying images by emitting light from a light guide plate to a display panel and a television receiver having the display device.

BACKGROUND AND SUMMARY

A thin display device (a liquid crystal display device, for example), whose occupancy area in a room is small in comparison with its display screen size, is widely spread to the public because a limited indoor space is utilized efficiently. A liquid crystal display device displays images by emitting light from a light source housed in a back cabinet to a liquid crystal display panel to display images, arranged in a front cabinet.

Japanese Patent Application Laid-Open No. 2006-330599 discloses a liquid crystal display device in which a light guide plate is arranged behind a liquid crystal panel and the light is emitted from the light guide plate to the liquid crystal panel. The liquid crystal panel is sandwiched between a bezel and a carriage frame and the light guide plate is sandwiched between the carriage frame and a back cover.

In a liquid crystal display device disclosed in Japanese Patent Application Laid-Open No. 2006-330599, a carriage frame is arranged between a light guide plate and a liquid crystal panel, therefore a space is created between the light guide plate and the liquid crystal panel. This space is not essential for displaying images. Instead, it prevents the liquid crystal display device from being thin.

The present invention has been made in view of the above circumstances. An object of the invention is to provide a thin display device and a television receiver having a display device, by reducing dimensions between a light guide plate and a display panel.

MEANS FOR SOLVING THE PROBLEMS

A display device, including: a display panel for displaying images; a light guide plate arranged behind the display panel for emitting incident light to the display panel; a back cabinet arranged behind the light guide plate; and a front cabinet arranged in front of the display panel, is characterized in that the display panel and the light guide plate are sandwiched by the front cabinet and the back cabinet in the front and back.

In the present invention, the dimension between the display panel and the light guide plate is reduced by holding the display panel and the light guide plate between the front cabinet and the back cabinet in the front and back without interposing a support member between the display panel and the light guide plate.

In the display device according to the present invention, an elastic member is interposed between the display panel and the front cabinet.

In the present invention, the elastic member is interposed between the display panel and the front cabinet to disperse the pressing force from the front cabinet to the display panel, and thereby damage and distortion to the display panel is prevented.

In the display device according to the present invention, the front cabinet is provided with a pressing part projecting backward for pressing the light guide plate backward.

In the present invention, the pressing part presses the light guide plate from the front, and thereby the holding force to the light guide plate is improved.

In the display device according to the present invention, the pressing part faces the edge part of the light guide plate.

In the present invention, since the pressing part faces the edge part of the light guide plate, not the center of the light guide plate, a quantity of light emitted from the light guide plate to the display panel is not reduced. Accordingly, the luminance of the display panel can be maintained.

In the display device according to the present invention, the elastic member is provided on the projecting end of the pressing part.

In the present invention, the elastic member is installed on the projecting end of the pressing part to disperse the pressing force from the projecting end to the light guide plate, so that damage and distortion to the light guide plate are prevented.

In the display device according to the present invention, a reflecting member for reflecting light is provided on the projecting end of the pressing part.

In the present invention, the reflecting member is installed on the projecting end of the pressing part and reflects light that reaches to the projecting end, so that the luminance of the display panel is enhanced.

In the display device according to the present invention, the inner edge part of the front cabinet having a frame shape supports the light guide plate and the display panel, and a part of the back cabinet facing the above-described inner edge part projects forward.

In the present invention, the area where the front cabinet and the back cabinet are opposed to each other is narrowed in a front-back width. The holding force is increased by sandwiching the light guide plate and the display panel at this narrowed area, and thereby the light guide plate and the display panel can be fixed to a predetermined position.

In the display device according to the present invention, the back cabinet faces the light guide plate and has a tray shape whose light guide plate side is open, a recessed part being recessed toward the light guide plate side is formed at the central portion of the back cabinet, and the display panel and the light guide plate are sandwiched between the bottom part of the recessed part and the inner edge part of the front cabinet.

In the present invention, the recessed part is formed at the central portion of the back cabinet, and the display panel and the light guide plate are sandwiched between the bottom part of the recessed part and the inner edge part of the front cabinet. Since the light guide plate receives the pressing force from the whole bottom part of the recessed part, the display panel and the light guide plate can be held firmly.

In the display device according to the present invention, a shading part for blocking the passage of light is arranged along the peripheral edge of the display panel, and the front cabinet and the back cabinet sandwiches the display panel at the area where the shading part is arranged or at the area close to the peripheral edge of the display panel with respect to the shading part.

In the present invention, the display panel is held at the position corresponding to the shading part or the side outer than the shading part (the peripheral edge side of the display panel). Therefore, even when a distortion to the display panel 10 occurs by the holding, no effect is caused on the images displayed on the display panel inner than the shading part.

In the display device according to the present invention, a part facing the peripheral surface of the light guide plate at the front cabinet projects to the light guide plate side, and a part facing the peripheral surface of the light guide plate at the front cabinet is provided with a light source.

In the present invention, since the light source is closer to the peripheral surface of the light guide plate, the light emitted from the light source reliably enters to the light guide plate and the luminance of the display panel is improved.

In the display device according to the present invention, the light source is a light-emitting diode.

In the present invention, the use of the light-emitting diode as the light source can improve a responding speed of light emission in comparison with that of a fluorescence tube, thus realizing more precise luminance control.

A television receiver according to the present invention includes any one of the above-described display devices and the receiving unit for receiving broadcast wave, wherein images are displayed on the display device based on the broadcast wave received at the receiving unit.

In the present invention, the use of the above-described display device in the television receiver realizes a thin television receiver.

In a display device and a television receiver according to the present invention, the dimensions between the display panel and a light guide plate is reduced and the device is made thinner by sandwiching the display panel and the light guide plate by a front cabinet and a back cabinet in the front and back without interposing a support member between the display panel and the light guide plate.

BRIEF DESCRIPTION OF THE DRAWINGS

FIG. 1 is a perspective view schematically illustrating a television receiver according to Embodiment 1;

DETAILED DESCRIPTION OF NON-LIMITING EXAMPLE EMBODIMENTS

Embodiment 1

Figure 2:
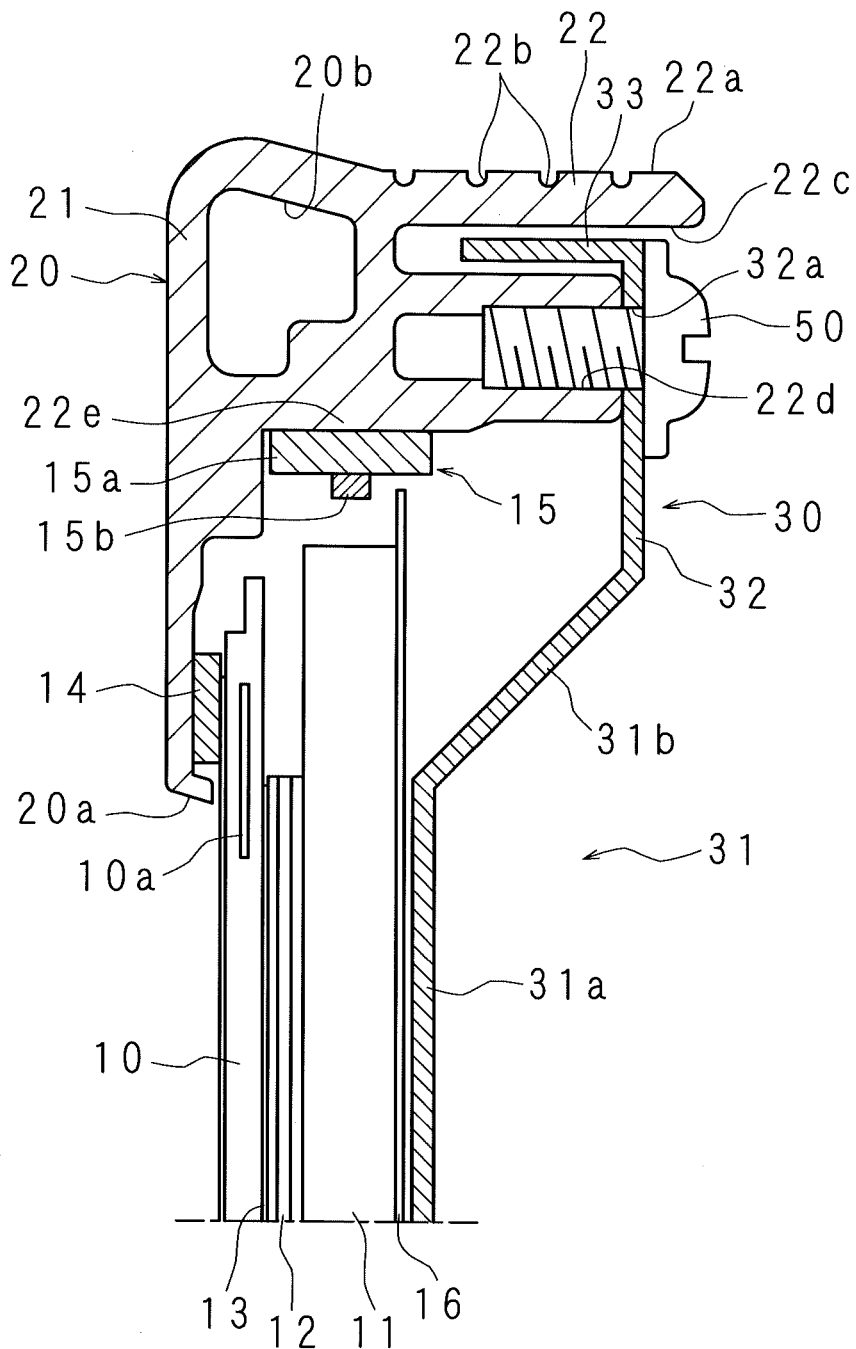
FIG. 2 is a vertical cross-sectional view schematically and partially illustrating the television receiver.

The present invention is described below in detail with reference to the drawings illustrating a television receiver according to Embodiment 1. FIG. 1 is a perspective view schematically illustrating a television receiver.

In the drawing, the numeral 1 denotes a television receiver, which includes: a display device 100 displaying images; a tuner 200 (a receiving unit) arranged in the display device 100 for receiving broadcast wave from an antenna (not shown); and a decoder 300 arranged in the display device 100 for decoding encoded broadcast wave. The television receiver 1 decodes the broadcast wave received by the tuner 200 with the decoder 300, and displays images on the display device 100 based on the decoded information. The tuner 200 and the decoder 300 may also be installed outside the display device 100 and connected to the display device 100. The television receiver 1 is provided with a stand 400 thereunder for supporting the television receiver 1.

The display device 100 has a rectangular-shaped display panel 10 having liquid crystal, and the display panel 10 is configured to adjust light transmittance by controlling an applied voltage to liquid crystal. The display panel 10 is disposed vertically in a front cabinet 20 and a back cabinet 30 arranged on the front and the back. The front cabinet 20 having a rectangular frame shape has a rectangular-shaped opening 20a at the center thereof. The front cabinet 20 is made of aluminum members, for example. The back cabinet 30 having a rectangular tray shape whose front side is open is made of, for example, electrogalvanized steel sheet. By making the front cabinet 20 and the back cabinet 30 out of metal, efficient heat radiation can be realized, and the differences in their thermal expansion coefficient can be reduced, and thus a distortion can be prevented from occurring. The front cabinet 20 and the back cabinet 30 can also be made of resin members.

The vertical and lateral dimensions of the front cabinet 20 and the back cabinet 30 are approximately equal to each other, and their peripheral edge parts are opposed to each other. The vertical and lateral dimensions of the display panel 10 are slightly larger than those of the opening 20a, and the peripheral edge part of the display panel 10 is opposed to the inner edge part of the front cabinet 20.

Figure 3:
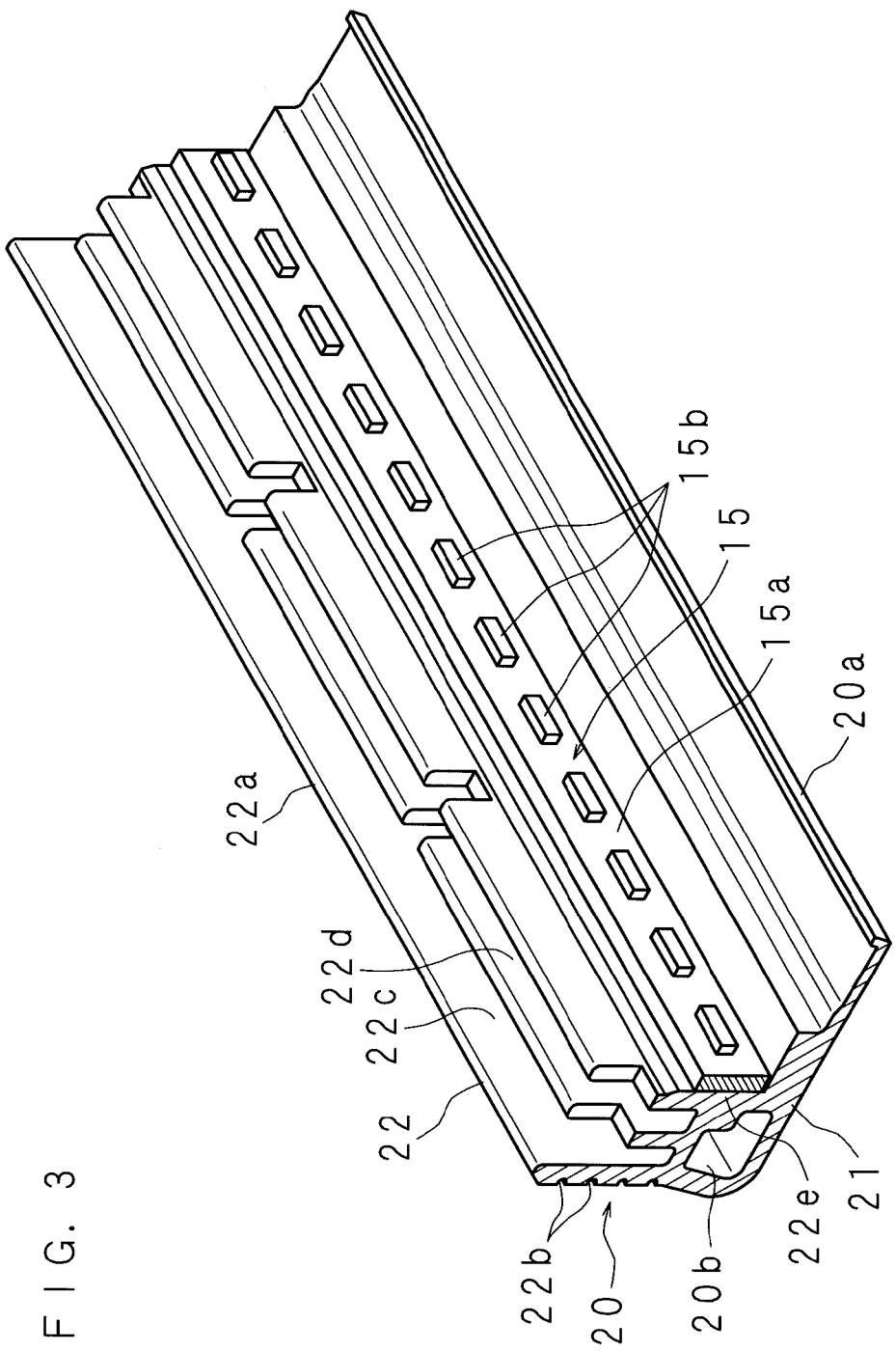
FIG. 3 is a perspective view schematically illustrating a part of a front cabinet.

FIG. 2 is a vertical cross-sectional view schematically and partially illustrating the television receiver 1. FIG. 3 is a perspective view schematically illustrating a part of the front cabinet 20.

The front cabinet 20 having the opening 20a at the center thereof has: a rectangular plate-shaped front frame part 21 whose front surface is exposed; and a projecting part 22 projected backward from the outer edge part (the edge part opposite to the opening 20 side) of the front frame part 21. The edge part of the opening 20a of the front frame part 21 bends backward, and an elastic member 14 is placed around this bent part to prevent damage to the display panel 10. The elastic member 14 is made of resin material (such as high-density microcell polyurethane foam, rubber or elastomer). The elastic member 14 is continuously or intermittently arranged along the edge part of the opening 20a. Inside a corner part of the front cabinet 20 where the front frame part 21 and a projecting part 22 join, a cavity 20b is continuously or intermittently formed along the entire periphery of the opening 20a. A peripheral surface 22a of the projecting part 22 (the surface opposite to the opening 20a side) is exposed, and a plurality of grooves 22b, 22b, . . . , 22b are formed on the peripheral surface 22a along the edge of the opening 20a.

The cavity 20b hardly transmits the heat generated by LED, which will be described later to the front corner part of the front cabinet 20, and this will secure the safety against the heat when the user touches the corner part. Moreover, with a plurality of grooves 22b, 22b, . . . , 22b, the exposed surface area of the front cabinet 20 is larger than that without the groove 22b, and thus the heat radiation efficiency is improved.

The projecting part 22 is provided with a latching groove 22c to latch the back cabinet 30 along the peripheral surface 22a, which is recessed forward. Next to the latching groove 22c, an insertion groove 22d, which is recessed forward, to receive a screw 50 is provided along the latching groove 22c. Each of the latching groove 22c and the insertion groove 22d is formed on the peripheral surface 22a side and the opening 20a side of the projecting part 22.

On the front part of the inner surface of the projecting part 22 (the surface of the opening 20a side), a light source placing part 22e, protruding inner than the back part (toward the opening 20a side), on which a light source is placed is formed. A light source unit 15 is fixed to the light source placing part 22e. The light source unit 15 has: an elongate rectangular-shaped substrate 15a installed on the light source placing part 22e; and a plurality of LEDs (Light Emitting Diode) 15b, 15b . . . 15b arranged side by side in a line on a surface of the substrate 15a opposite to the light source placing part 22e. The LED 15b is arranged along the longitudinal direction of the substrate 15a.

The substrate 15a is bonded to the light source placing part 22e with double-sided adhesive tape with high thermal conductivity, and further, is securely fixed with screws. The substrate 15a may be fixed to the light source placing part 22e with either the double-sided adhesive tape or the screws. The LED 15b is one example of the light source that emits light to a light guide plate 11, and an electric bulb, a hot cathode fluorescent lamp, an EL (Electro Luminescence), a cold cathode tube etc., may also be used.

The display panel 10 is placed behind the front frame part 21. The peripheral edge part of the display panel 10 is opposed to the edge of the inner side of the front frame part 21 with the elastic member 14 interposed therebetween. Inside the peripheral edge part of the display panel 10, a shading part 10a for blocking the passage of light is peripherally arranged. The shading part 10a includes an area that is located outside the opening 20a, and that area faces the opening 20a side part of the elastic member 14. A part of the elastic member 14 opposite to the opening 20a side is located outside the shading part 10a.

Behind the display panel 10, the rectangular-shaped light guide plate 11, facing the display panel 10, is provided. The lateral and vertical dimensions of the light guide plate 11 slightly exceed those of the display panel 10. The light guide plate 11 is substantially aligned with the LED 15b in a front-and-back direction, and the peripheral surface of the light guide plate 11 faces and is close to the LED 15b. On the front surface of the light guide plate 11, a rectangular-shaped diffusion sheet 12 for uniformly diffusing light emitted from the front surface of the light guide plate 11 and the rectangular-shaped optical sheet 13 that condenses light diffused by the diffusion sheet 12 toward the display panel 10 are provided in that order. The optical sheet 13 is arranged adjacent to the back surface of the display panel 10. The vertical and lateral dimensions of the diffusion sheet 12 and the optical sheet 13 are smaller than those of the light guide plate 11.

On the back surface of the light guide plate 11, a reflecting sheet 16 to reflect incident light forward is provided. The vertical and lateral dimensions of the reflecting sheet 16 are larger than those of the light guide plate 11. The light emitted from the LED 15b enters the peripheral surface of the light guide plate 11, reflects inside the reflecting sheet 16 and the light guide plate 11, and is emitted from the front surface of the light guide plate 11. The emitted light passes through the diffusion sheet 12 and the optical sheet 13, and then reaches to the display panel 10.

The back cabinet 30 is provided behind the light guide plate 11. The back cabinet 30 having a rectangular tray shape whose front side is open is vertically arranged. At the central portion of the back cabinet 30, a recessed part 31 projected forward is formed. The bottom part 31a of the recessed part 31, having a plate shape and being substantially parallel to the light guide plate 11, is opposed to and is arranged adjacent to the reflecting sheet 16. The vertical and lateral dimensions of the bottom part 31a are approximately equal to those of the opening 20a. The peripheral edge part of the bottom part 31a is opposed to the edge part of the opening 20a (the part that is bent backward), and is placed inner than the elastic member 14 (the opening 20a side). The side surface part 31b of the recessed part 31 continues to the bottom part 31a and inclines so that the recessed part 31 spreads from the bottom part 31a toward the back. The part where the bottom part 31a continues to the side surfaces 31b faces the shading part 10a in the front-and-back direction.

The back end of the side surface part 31b is located backwards in comparison with the insertion groove 22d and the latching groove 22c. The back end of the side surface part 31b continues to the plate-shaped: peripheral edge part 32 that is substantially parallel to the bottom part 31a, and the peripheral edge part 32 extends to the latching groove 22c.

The extending end part of the peripheral edge part 32 continues to the latching part 33. The latching part 33 extends forward and latches to the plate-shaped latching groove 22c. The latching part 33 is inserted into the latching groove 22c and latched to the latching groove 22c. The part where the peripheral edge part 32 faces the insertion groove 22d is provided with a penetrating insertion hole 32a for receiving the screw 50. The screw 50 is inserted into the penetrating insertion hole 32a and threaded into the insertion groove 22d by tapping.

By means of threading the screws 50, the edge of the opening 20a and the bottom part 31a press, with the elastic member 14 interposed therebetween, the display panel 10 and the light guide plate 11 together. As a result, the dimensions between the display panel 10 and the light guide plate 11 are reduced by sandwiching the display panel 10 and the light guide plate 11 by the front cabinet 20 and the back cabinet 30 in the front and back without interposing a support member between the display panel 10 and the light guide plate 11, so that the thin display device 100 and the television receiver 1 are manufactured.

Moreover, by interposing the elastic member 14 between the display panel 10 and the front cabinet 20 to disperse the pressing force from the front cabinet 20 to the display panel 10, distortion and damage to the display panel 10 are prevented from occurring.

Since at least the front-back width between the bottom part 31a and the edge part of the opening 20a is narrow in comparison with other parts, the sandwiching force is increased by sandwiching the light guide plate 11 and the display panel 10 at this narrowing part, and the light guide plate 11 and the display panel 10 are fixed to a predetermined position.

Further, since the display panel 10 is held at the position corresponding to the shading part 10a or the outside of the shading part 10a via the elastic member 14, even when a distortion to the display panel 10 occurs by sandwiching, the distortion stays in the shading part 10a area. Hence, the images displayed on the inner side of the shading part 10a will not be influenced by the distortion. Also, as the LED 15b is close to the peripheral surface of the light guide plate 11, the light emitted from the LED 15b reliably enters the light guide plate 11 and the luminance of the display panel 10 is enhanced. Moreover, the use of the LED 15b as a light source improves a responding speed for light emission in comparison with that of a fluorescence tube, thus realizing more precise luminance control.

Moreover, the recessed part 31 is formed at the central portion of the back cabinet 30, and the display panel 10 and the light guide plate 11 are sandwiched between the bottom part 31a of the recessed part 31 and the edge of the opening 20a. Since the light guide plate 11 receives the pressing force from the whole bottom part 31a of the recessed part 31, the display panel 10 and the light guide plate 11 are held firmly.

While the front cabinet 20 and the back cabinet 30 are joined by threading the screws 50 into the insertion grooves 22d in Embodiment 1, the method of joining the front cabinet 20 and the back cabinet 30 is not limited thereto. For example, instead of forming the insertion grooves 22d in the front cabinet 20, the screws 50 can be threaded into the flat surface of the front cabinet 20. The light source unit 15 is placed on at least one side of the rectangular shaped front cabinet 20. For example, the light source unit 15 may be placed on each of the four sides or two opposing sides of the front cabinet 20.

Embodiment 2

The present invention is described below in detail with reference to the drawings illustrating a television receiver 1 according to Embodiment 2.

Figure 4:
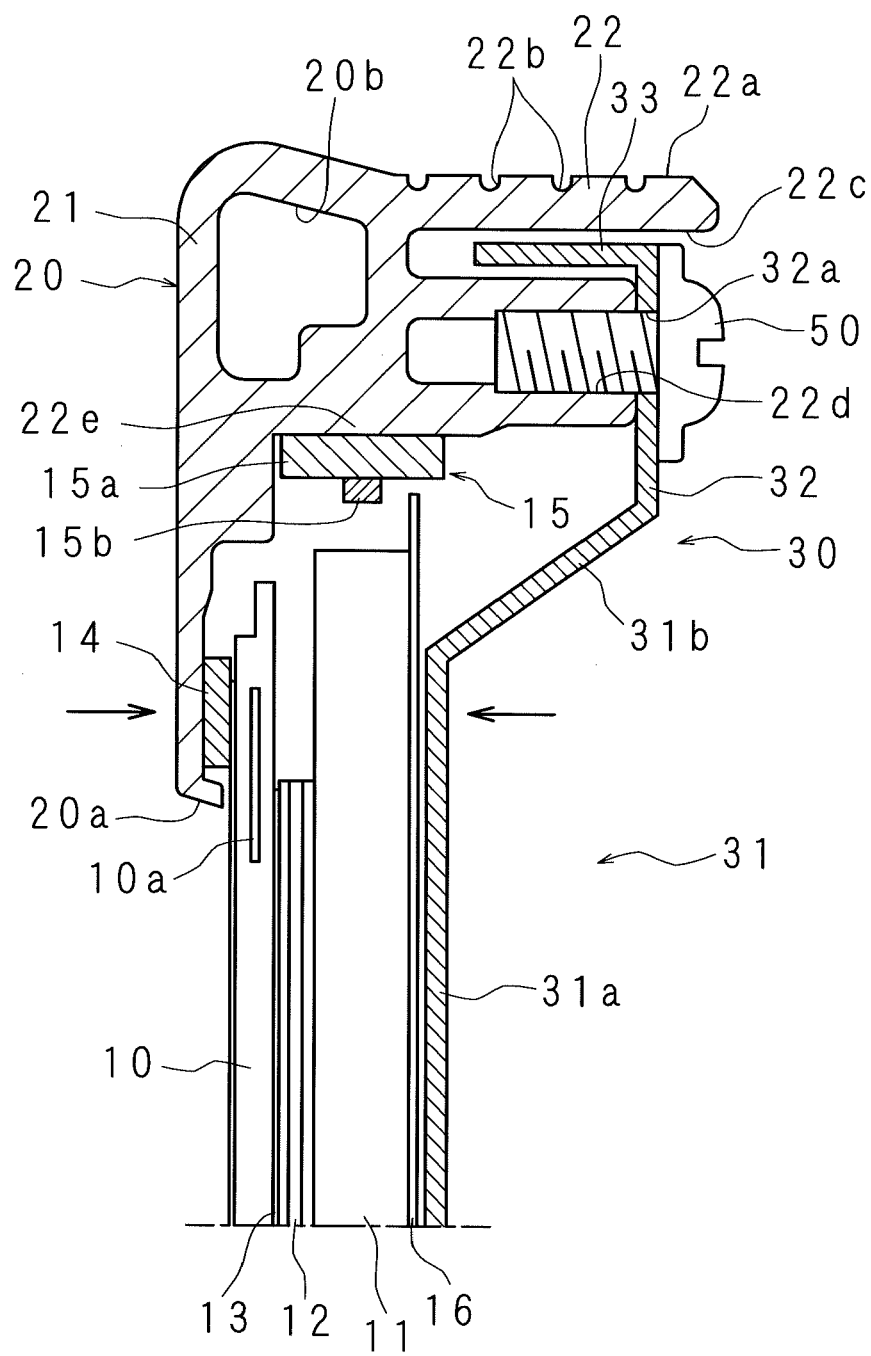
FIG. 4 is a vertical cross-sectional view schematically and partially illustrating a television receiver according to Embodiment 2.

FIG. 4 is a vertical cross-sectional view schematically and partially illustrating a television receiver 1. As illustrated in FIG. 4, the peripheral edge part of a bottom part 31a of a recessed part 31 of a back cabinet 30 faces an elastic member 14. The peripheral edge part of the bottom part 31a and the elastic member 14 (the edge part of an opening 20a) are located at the same position in a direction perpendicular to the front-back direction. Consequently, when screws 50 are threaded into insertion grooves 22d, backward and forward forces in opposite directions act on a display panel 10 and a light guide plate 11 respectively between the peripheral edge part of the bottom part 31a and the edge part of the opening 20a (see the arrows shown in FIG. 4). The display panel 10 and the light guide plate 11 are sandwiched by strong force from the front and back to be supported stably.

Since the configuration of the television receiver 1 of Embodiment 2 is similar to that of Embodiment 1, the same reference numbers are assigned to the common structures and the detailed explanation thereof will not be repeated.

Embodiment 3

Figure 5:
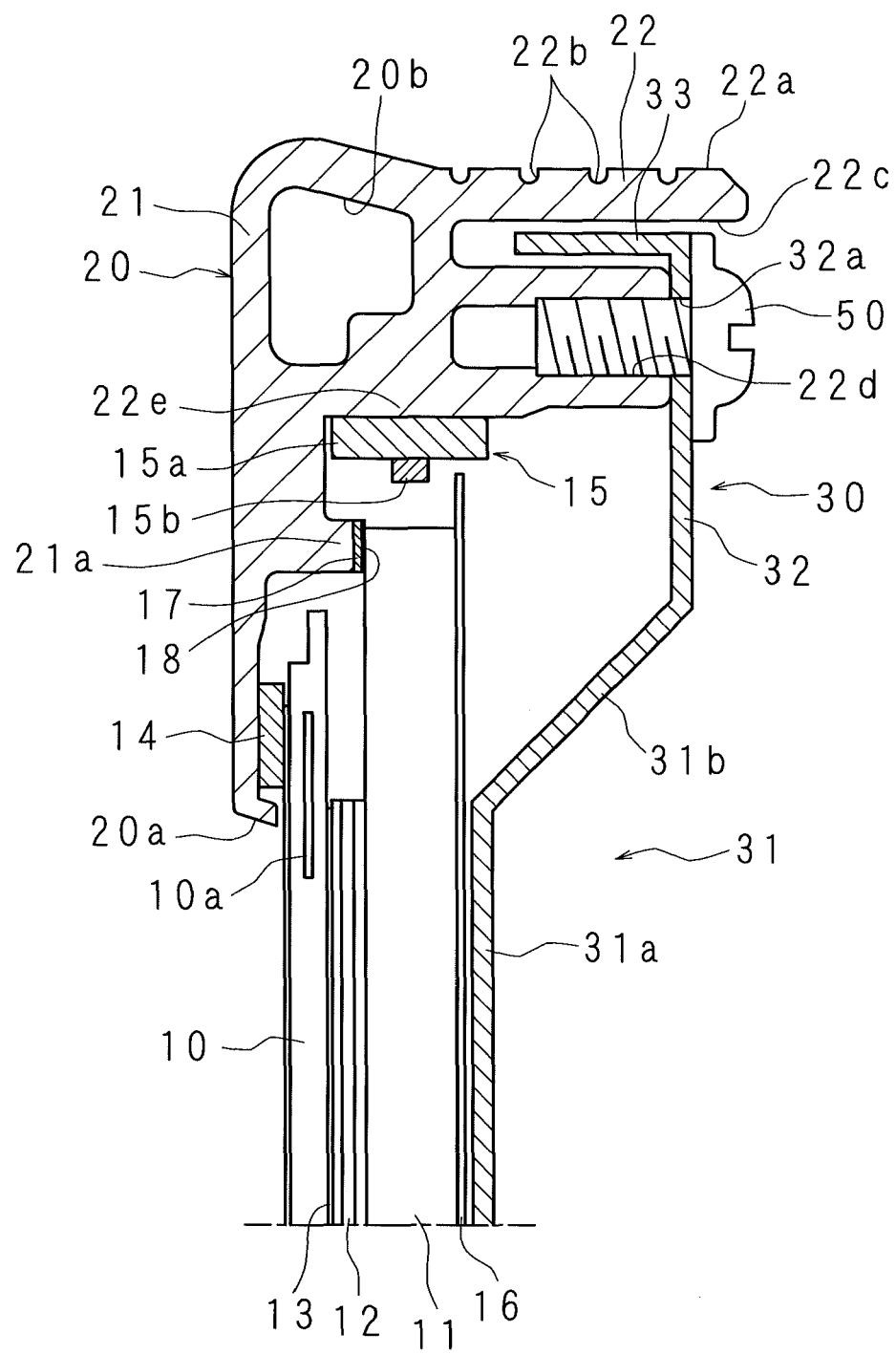
FIG. 5 is a vertical cross-sectional view schematically and partially illustrating the television receiver.
Figure 6:
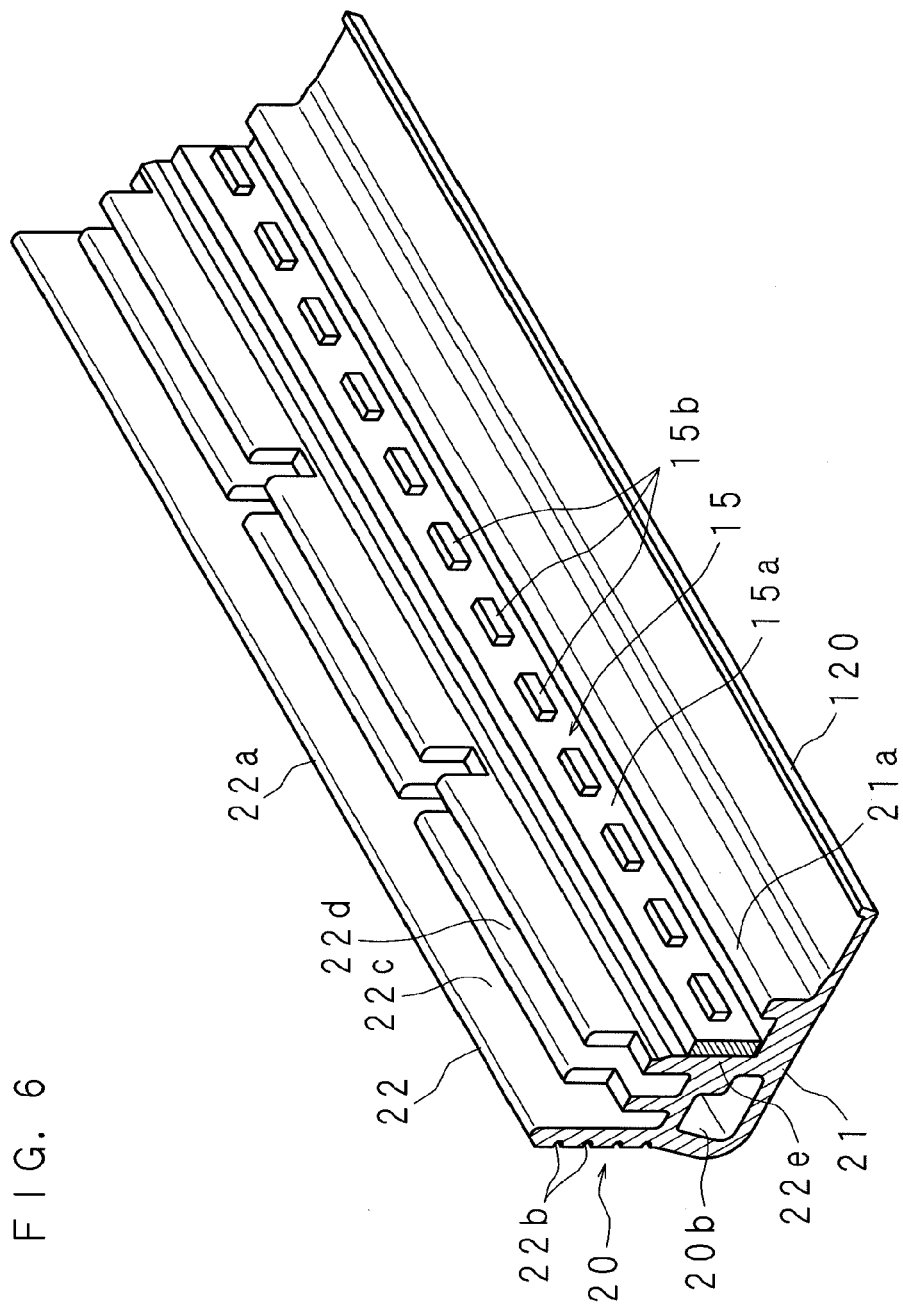
FIG. 6 is a perspective view schematically and partially illustrating a part of a front cabinet of a television receiver according to Embodiment 3.

The present invention is described below in detail with reference to the drawings illustrating a television receiver 1 according to Embodiment 3. FIG. 5 is a vertical cross-sectional view schematically and partially illustrating a television receiver 1. FIG. 6 is a perspective view schematically illustrating a part of a front cabinet 20 of the television receiver 1.

As illustrated in FIG. 5 and FIG. 6, on a front frame part 21 of a front cabinet 20, a pressing part 21a that projects backward and presses a light guide plate 11 is formed between an opening 20a and a light source placing part 22e. The pressing part 21a is arranged to face the edge of the light guide plate 11. An elastic member 17 and a reflecting sheet 18 (reflecting member) are successively placed on an projecting end of the pressing part 21a, then the pressing part 21a presses the light guide plate 11 from the front to the back through the elastic member 17 and the reflecting sheet 18. The elastic member 17 is made of resin material (such as high-density microcell polyurethane foam, rubber, or elastomer).

Because the edge of the opening 20a presses a display panel 10 and the light guide plate 11 from the front to the back, and further the pressing part 21a presses the light guide plate 11 from the front, the sandwiching force to the light guide plate 11 is improved, and the light guide plate 11 can be stably fixed to a predetermined position. Also, since the reflecting sheet 18 is placed on the projecting end of the pressing part 21a (the part that is directly in contact with the light guide plate 11), light reliably reflects on the part pressed by the pressing part 21a. Thus the luminance of the display panel 10 is improved. Moreover, since the pressing force from the projecting end of the pressing part 21a to the light guide plate 11 is dispersed by the elastic member 17, distortion and damage to the light guide plate 11 are prevented from occurring. Also, in case that the elastic member 17 is made of a material having translucency, the elastic member 17 and the reflecting sheet 18 can be placed on the projecting end of the pressing part 21a in the order of the reflecting sheet 18 and the elastic member 17.

Furthermore, because the pressing part 21a faces not the central portion of the light guide plate 11 but the edge of the light guide plate 11, a quantity of light emitted from the light guide plate 11 to the display panel 10 is not reduced. Accordingly, the luminance of the display panel 10 is maintained.

Since the configuration of the television receiver 1 of Embodiment 3 is similar to that of Embodiment 1 or 2, the same reference numbers are assigned to the common structures and the detailed explanation thereof will not be repeated.

Embodiment 4

Figure 7:
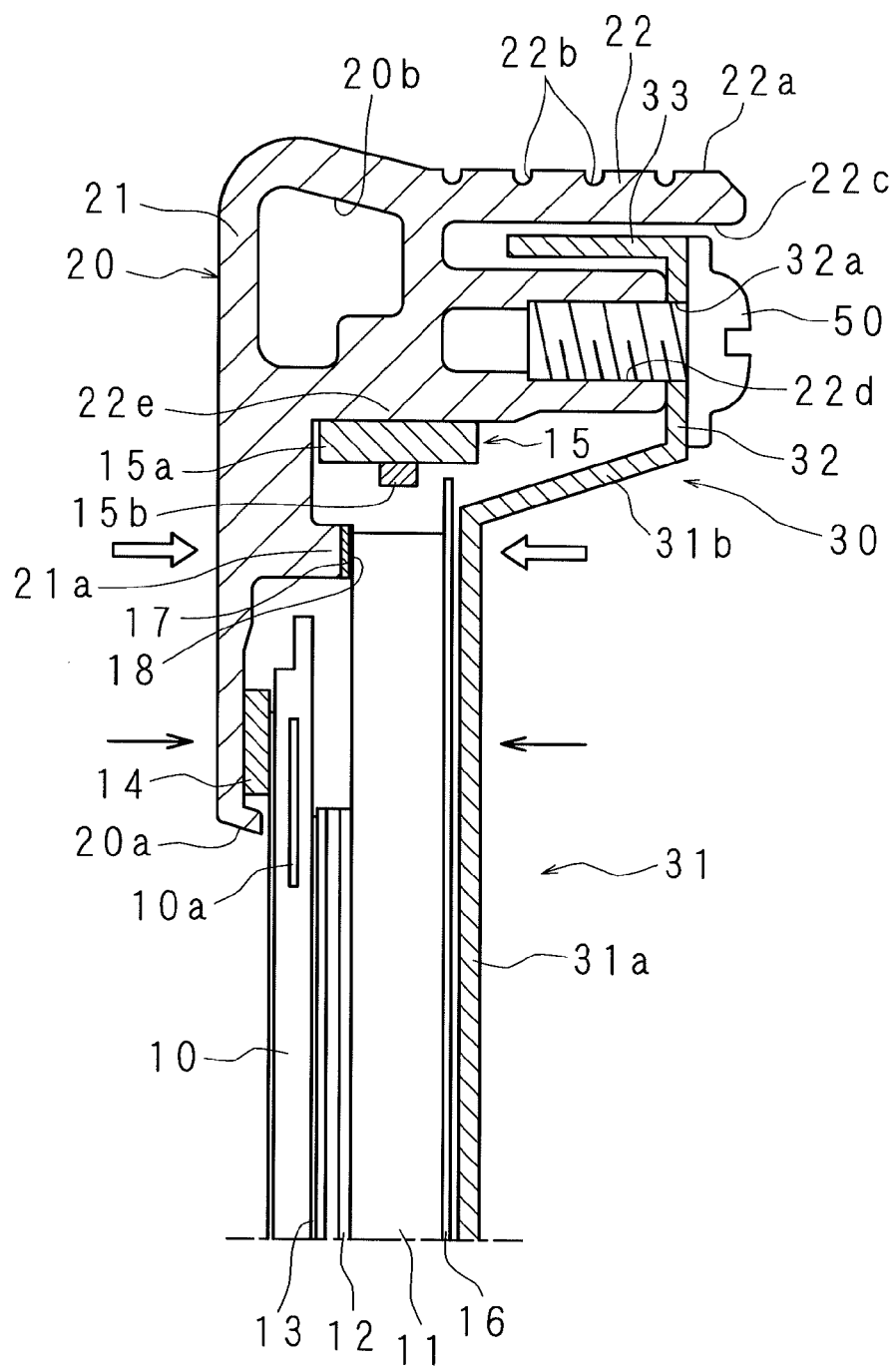
FIG. 7 is a vertical cross-sectional view schematically and partially illustrating a television receiver according to Embodiment 4.

The present invention is described below in detail with reference to the drawings illustrating a television receiver 1 according to Embodiment 4. FIG. 7 is a vertical cross-sectional view schematically and partially illustrating the television receiver 1.

As illustrated in FIG. 7, the peripheral edge part of a bottom part 31a of a recessed part 31 of a back cabinet 30 faces a pressing part 21a. The peripheral edge part of the bottom part 31a and the pressing unit 21a are located at the same position in a direction perpendicular to the front-back direction. Consequently, when screws 50 are threaded into insertion grooves 22d, the force in opposite directions acts on a light guide plate 11 both from the front and the back (see the void arrows shown in FIG. 7) between the peripheral edge part of the bottom part 31a and the pressing part 21a. The light guide plate 11 is sandwiched by the strong force from the front and back to be supported stably. Furthermore, between the bottom part 31a and the edge part the opening 20a, the force in opposite directions, acting on a display panel 10 and the light guide plate 11 respectively (see the arrows shown in FIG. 7), firmly fix the display panel 10 and the light guide plate 11 together combined with the force shown by the void arrows.

The back cabinet 30 projects forward in the area between the center of the back cabinet 30 and the place where it faces the pressing part 21a by forming the recessed part 31. As a result, at least from the edge part of the opening 20a to the pressing part 21a, the front-to-back width of a front cabinet 20 and the back cabinet 30 is narrow. Because the light guide plate 11 and the display panel are sandwiched in this narrowed part, a light guide plate 11 and a display panel 10 are firmly sandwiched from the front and the back at two locations, as described above, and are securely fixed at a predetermined position.

Since the configuration of the television receiver 1 of Embodiment 4 is similar to that of Embodiments 1 to 3, the same reference numbers are assigned to the common structures and the detailed explanation thereof will not be repeated.

Figure 8A:
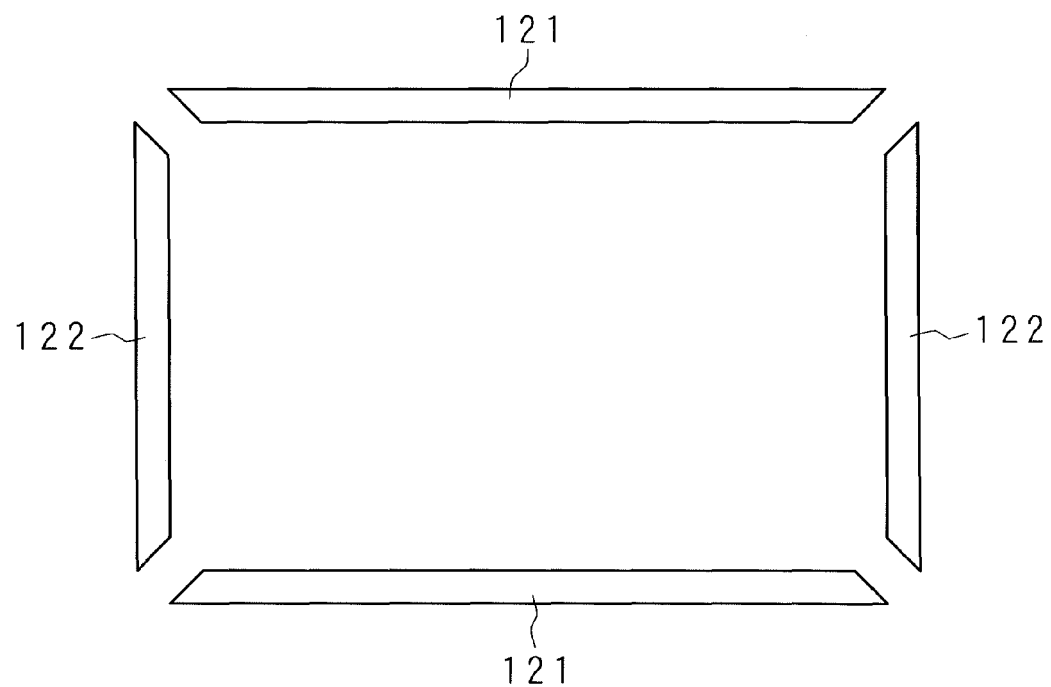
FIG. 8A is an explanatory drawing explaining a manufacturing process of the front cabinet.
Figure 8B:
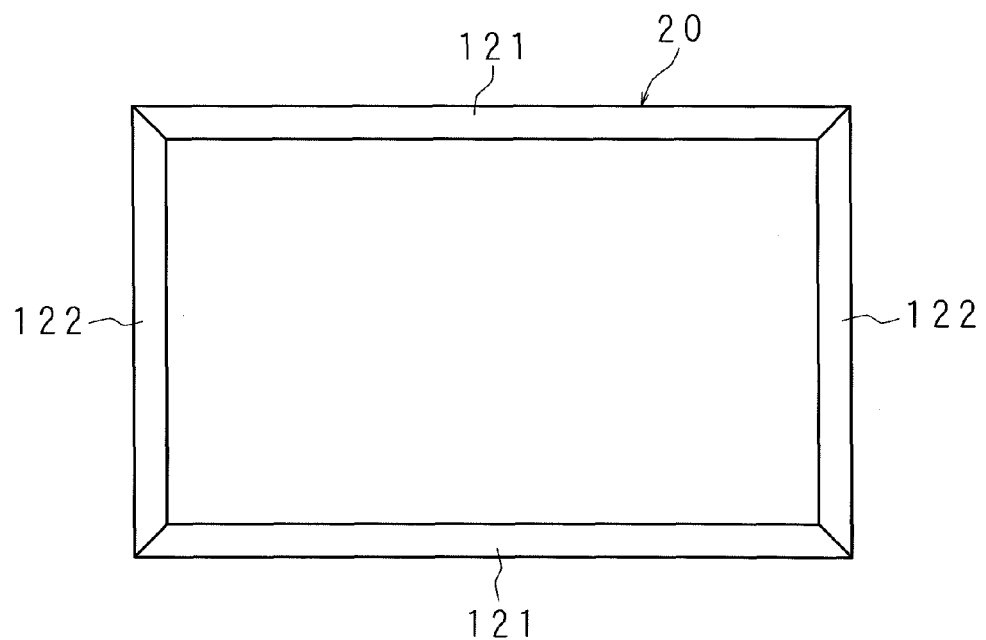
FIG. 8B is an explanatory drawing illustrating a manufacturing process of the front cabinet.

In Embodiments 1 to 4, the front cabinet 20 is manufactured as follows, for example. FIG. 8A and FIG. 8B are the explanatory drawings illustrating a manufacturing process of the front cabinet 20. As illustrated in FIG. 8A, two narrow long rods 121, 121 and short rods 122, 122 that are shorter than the long rods 121 are prepared. The long rod 121 and the short rod 122 are manufactured by extrusion molding. The long rod 121 and the short rod 122 can also be manufactured by other methods such as protrusion molding, injection molding or press molding.

Each of the long rod 121 and the short rod 122 has a cross sectional structure as shown in FIG. 2, FIG. 4, FIG. 5 or FIG. 7. Each of the both end surfaces of the long rod 121 and the short rod 122 has inclined surfaces crossing with respect to the longitudinal direction. At both ends of the long rod 121 and the short rod 122, the inclination angles of the inclined surfaces thereof with respect to the longitudinal direction are approximately the same and the inclination directions are opposite to each other. For example, when the inclination angle and the inclination direction of one of the inclined surfaces is +30°, those of the other is −30°. The inclination angles of the inclination surfaces of the long rod 121 and the short rod 122 are substantially the same. The long rods 121, 121 are so arranged that they face each other. The short rods 122, 122 are so arranged that they face each other and also are perpendicular to the long rods 121, 121. Moreover, the respective end surfaces of the long rod 121 and the short rod 122 face each other.

As illustrated in FIG. 8B, the front cabinet 20 is manufactured by joining the end surfaces of the long rod 121 and the short rod 122. Here, the long rod 121 and the short rod 122 can be joined by known joining means. For example, the long rod 121 and the short rod 122 are provided with metal fittings on their joining parts to be screwed. When the long rod 121 and the short rod 122 are made of metal, they can be joined by welding. In case that at least one of the long rod 121 and the short rod 122 is made of resin material, they can be joined by high frequency welding. The manufacturing method of the front cabinet 20 is, however, not limited to the above-described ones. The entire piece of the front cabinet 20 can be integrally molded by injection molding, for example.

The above-mentioned embodiments are examples of the invention, and the invention can be carried out in various modified forms within the descriptions of the claims and the scope defined based on the matters described in the claims.

EXPLANATION OF REFERENCE NUMERALS 1 television receiver
10 display panel
10a shading part
11 light guide plate
12 diffusion sheet
12 optical sheet
14, 17 elastic member
15 light source unit
15b LED (light source, light-emitting diode)
16, 18 reflecting sheet (reflecting member)
20 front cabinet
21a pressing part
30 back cabinet
100 display device
200 tuner

The invention claimed is:

1. A display device, comprising:
a display panel for displaying an image;
a light guide plate arranged behind the display panel to emit incident light to the display panel;
a back cabinet arranged behind the light guide plate; and
a front cabinet arranged in front of the display panel, wherein
the display panel and the light guide plate are held between the front cabinet and the back cabinet,
the light guide plate is extended both in lateral and vertical directions with respect to the display panel,
the front cabinet is provided with a pressing part projecting straight backward to press a part of the light guide plate backward, the part of the Light guide plate being extended at the end with respect to the display panel, and
the display panel further comprising an optical sheet interposed between the light guide plate and the display panel without a spacer.

2. The display device according to claim 1, wherein an elastic member is interposed between the display panel and the front cabinet.

3. The display device according to claim 1, wherein an elastic member is installed on a projecting end of the pressing part.

4. The display device according to claim 1, wherein a reflecting member to reflect light is installed on the projecting end of the pressing part.

5. The display device according to claim 1, wherein:
an inner edge part of the front cabinet having a frame shape supports the light guide plate and the display panel; and
a part of the back cabinet facing the inner edge part of the front cabinet projects forward.

6. The display device according to claim 1, wherein:
a shading part to block a passage of light is arranged along a peripheral edge of the display panel; and
the front cabinet and the back cabinet hold the display panel at an area where the shading part is arranged or at an area closer to the peripheral edge of the display panel than the shading part.

7. A television receiver, comprising the display devices according to claim 1 and a receiving unit to receive broadcast wave, wherein a image is displayed on the display device based on the broadcast wave received at the receiving unit.

8. The display device according to claim 1, wherein the front cabinet comprises:
a front frame part having a front surface that is exposed; and
a projecting part projected backward from an outer edge part of the front frame part,
wherein the pressing part projects backward from a back side of the front frame part.

9. The display device according to claim 1, wherein the pressing part almost directly presses the light guide plate.

10. The display device according to claim 1, wherein the front cabinet is single.

11. A display device, comprising:
a display panel for displaying an image;
a light guide plate arranged behind the display panel to emit incident light to the display panel;
a back cabinet arranged behind the light guide plate; and
a front cabinet arranged in front of the display panel, wherein
the display panel and the light guide plate are held between the front cabinet and the back cabinet,
the light guide plate is extended both in lateral and vertical directions with respect to the display panel,
the front cabinet is provided with a pressing part projecting straight backward to press a part of the light guide plate backward, the part of the light guide plate being extended at the end with respect to the display panel, a part facing a peripheral surface of the light guide plate in the front cabinet projects to the light guide plate side, a light source is installed at the part facing the peripheral surface of the light guide plate in the front cabinet, and the display panel further comprising an optical sheet interposed between the light guide plate and the display panel without a spacer.

12. A display device according to claim 11, wherein the light source is a light-emitting diode.

* * * * *